Patented Dec. 15, 1931

1,836,897

UNITED STATES PATENT OFFICE

EARL D. BROWN, GLENN DAVIDSON, AND IRVING F. LAUCKS, OF SEATTLE, WASHINGTON, ASSIGNORS TO I. F. LAUCKS, INC., OF SEATTLE, WASHINGTON, A CORPORATION OF WASHINGTON

PROCESS OF REDUCING THE WATER REQUIREMENT OF COMPOSITIONS OF MATTER EMBODYING VEGETABLE PROTEIN CONTAINING MATERIAL AND TO THE PRODUCT THEREOF

No Drawing.   Application filed November 14, 1927.  Serial No. 233,306.

Our invention relates to a process of reducing the water requirement of compositions of matter embodying vegetable protein containing material and to the product thereof.

More particularly, our invention relates to a process of reducing, by the addition of certain compounds, the amount or proportion of water which is required nominally (that is, without such addition) to bring the vegetable protein containing material to a state of colloidal dispersion in the water and to the product thereof.

By the term vegetable protein containing materials we mean to include not only the residues remaining after the oil has been extracted, in whole or in part, from leguminous oil seeds such as soya beans, peanuts, etc., and from other oil seeds such as cottonseed, linseed and the like, but the protein material obtained by extraction from such sources of vegetable protein, either before or after removal of the oil content in whole or in part. In illustration we may cite as examples of residues of oil seeds of the leguminous variety, soya bean cake or meal and peanut cake or meal, as examples of other oil seed residues; cottonseed and linseed cake or meal and as example of extracted protein material the matter obtained by extraction and coagulation, by suitable mediums commonly known to science of the albuminous material contained in soya beans, peanuts, cottonseed, linseed, etc. We do not confine ourselves to the residues, flours and extracts named, but claim as equivalents such other vegetable protein containing materials as are illustrated by the examples above.

In the use of vegetable protein containing materials in the arts, it is frequently very advantageous to secure dispersion of such materials in as small an amount of water as possible and further in some cases this is an absolute essential to efficient use of the material, as, for instance, in the preparation of adhesives comprised in part of vegetable protein containing material. Obviously in gluing, in order to obtain strength, it is necessary to apply an adhesive having the minimum of dilution. Also, for example in gluing plywood, it is of great advantage to employ an adhesive which, because of its low water requirement involves the minimum of increase moisture content of the plywood.

We have discovered a number of substances which have the property of reducing the amount of water required to bring vegetable protein containing material to a state of colloidal dispersion. We have also discovered that other substances increase the amount of water required to bring these materials to a state of colloidal dispersion.

To exemplify the discovery, we will set forth a number of substances which, when used with vegetable protein containing materials, we have found to reduce the "water requirement" and to further illustrate we will list a number of substances which we have found to increase the "water requirement".

As examples of vegetable protein containing materials we cite for purposes of illustration such commercial substances as flours obtained by fine grinding of soya bean, peanut, cottonseed and linseed cake and meals.

We have found that a given quantity of soya bean flour, peanut flour or cottonseed flour require certain proportions of water to bring such flour to a state of colloidal dispersion or a given consistency. We have found that additions of small amounts of alkali sulphites, as sodium sulphite or potassium sulphite, have the property of reducing the amount of water required to bring the composition of matter to the same state or consistency. On the other hand, we have found that addition of caustic soda increases the amount of water required.

To further and more particularly illustrate: 50 grams of soya bean flour may be mixed with 100 cubic centimeters of water and we have found that it requires the addition of approximately 20 cc. more of water to bring the mixture to a proper consistency or state of colloidal dispersion. However, if to the mixture of 50 grams of soya bean flour and 100 cubic centimeters of water addition is made of 3 grams of sodium sulphite, either in the dry state in the flour before addition of water, or in solution in the water, no more than the 100 cc. of water is required to realize the same degree of dispersion, i. e., consistency of the composition of matter as that before obtained by the addition of approximately 120 cc. of water.

On the other hand, we have found substances which may be added to the mixture of vegetable protein containing material and water without materially increasing the "water requirement" as, for instance, oleic acid, calcium tartrate, carbon bisulphide, sodium acid carbonate, boric acid, calcium chloride, sodium silico fluoride, ammonium phosphate, sodium pyrophosphate.

Also we have found substances which when added to the mixtures of vegetable protein containing material and water increase, the "water requirement" as for instance barium fluoride, barium hydrate, calcium arsenate, sodium hydrate, aluminum sulphate, calcium citrate, barium oxalate, sodium perborate, aniline, potassium permanganate.

In further illustration, we give below some of the substances which we have found, which, when added to vegetable protein containing material, as, for instance, soya bean flour, and water, reduce the "water requirement" below the amount necessary to secure the same consistency or state of colloidal dispersion when no other substance is mixed in the composition of matter save vegetable protein containing material and water.

Sodium sulphite, potassium sulphite, sodium acid sulphite, sulphurous acid, sodium hydro sulphite, sodium hyposulphite, sodium thio sulphate, waste sulphite liquor from paper mills, barium sulphide, potassium sulphide, sodium sulphide, calicum polysulphide, sodium thiocarbonate, sodium molybdate, sodium oxalate, potassium chlorate, potassium nitrite, phosphoric acid, ammonium oxalate, ammonium acetate, sodium acetate, sodium chloride, mono hydrated sodium carbonate, monosodium phosphate, sodium formate, thio-urea, thio-carbanilide, crude phenol, magnesium chloride, magnesium oxide, lithopone, zirconium hydrate, zirconium sulphate, zinc acetate, strontium hydrate, strontium nitrite, potassium fluoride, sodium fluoride, etc.

The above noted compounds by no means exhaust the list of "water requirement" reducing substances and we do not limit our claims to them but claim all such substances having the effect described upon vegetable protein containing materials.

We claim,

1. A composition of matter embodying a vegetable protein containing material, water and an alkali metal sulphite.

2. A composition of matter embodying a vegetable protein containing material, water and sodium sulphite.

3. A composition of matter embodying oleaginous seed residues, water and an alkali metal sulphite.

4. A composition of matter embodying oleaginous seed residues, water and sodium sulphite.

5. A composition of matter embodying residues of oleaginous seeds of the family leguminosæ, water and an alkali metal sulphite.

6. A composition of matter embodying residues of oleaginous seeds of the family leguminosæ, water and sodium sulphite.

7. A composition of matter embodying soya bean flour, water and an alkali metal sulphite.

8. A composition of matter embodying soya bean flour, water and sodium sulphite.

In witness whereof we hereunto subscribe our names this 5th day of October, A. D. 1927.

EARL D. BROWN.
GLENN DAVIDSON.
IRVING F. LAUCKS.